United States Patent [19]
Frencken et al.

[11] Patent Number: 6,125,146
[45] Date of Patent: Sep. 26, 2000

[54] METHOD AND DEVICE FOR DECODING CODED DIGITAL VIDEO SIGNALS

[75] Inventors: Peter Frencken, Weert; Peter De With, Eindhoven, both of Netherlands

[73] Assignee: U.S. Philips Corporation, New York, N.Y.

[21] Appl. No.: 09/011,367

[22] PCT Filed: Jun. 4, 1997

[86] PCT No.: PCT/IB97/00639

§ 371 Date: Feb. 4, 1998

§ 102(e) Date: Feb. 4, 1998

[87] PCT Pub. No.: WO97/47139

PCT Pub. Date: Dec. 11, 1997

[30] Foreign Application Priority Data

Jun. 5, 1996 [EP] European Pat. Off. .............. 96401202
Feb. 25, 1997 [EP] European Pat. Off. .............. 97400410

[51] Int. Cl.⁷ ........................................................ H04N 7/12
[52] U.S. Cl. .................................. 375/240.24; 348/420.1; 348/421.1
[58] Field of Search ........................... 348/402, 404–405, 348/416, 420–421, 390, 384, 406, 420.1, 421.1; 375/240, 240.24, 375; 382/239, 248, 251

[56] References Cited

U.S. PATENT DOCUMENTS

| | | | |
|---|---|---|---|
| 5,049,990 | 9/1991 | Kondo et al. | 348/421 |
| 5,193,003 | 3/1993 | Kondo | 348/420 |
| 5,400,075 | 3/1995 | Savatier | 348/384 |
| 5,420,705 | 5/1995 | Ray | 358/523 |
| 5,444,487 | 8/1995 | Kondo et al. | 348/405 |
| 5,604,602 | 2/1997 | Guillotel et al. | 386/33 |
| 5,734,433 | 3/1998 | Kondo et al. | 348/421 |
| 5,774,597 | 6/1998 | Wilson | 382/250 |
| 5,815,206 | 9/1998 | Malladi et al. | 348/390 |
| 5,825,419 | 10/1998 | Mishima et al. | 348/402 |

FOREIGN PATENT DOCUMENTS

| | | | |
|---|---|---|---|
| 0618722A1 | 10/1994 | European Pat. Off. | H04N 5/907 |
| 0618733A2 | 10/1994 | European Pat. Off. | H04N 7/12 |
| 0714208A2 | 5/1996 | European Pat. Off. | H04N 7/12 |
| 0716395A1 | 6/1996 | European Pat. Off. | G06T 9/00 |

OTHER PUBLICATIONS

Monet et al, "Block Adaptive Quantization of Images", IEEE Trans. on Comm., vol. 41, No. 2, Feb., 1993, pp. 303–306.

Alter–Gartenberg, "Nonlinear Dynamic Range Transformation in Visual Communication Channels", IEEE Trans. on Image Processing, vol. 5, No. 3, Mar. 1996, pp. 538–546.

"A Video Copression Standard for Multimedia Applications", by D. Le Gall, Communications of the ACM, Apr. 1991, vol. 34, No. 4, pp. 46–58.

*Primary Examiner*—Vu Le

[57] ABSTRACT

The invention relates to a video coding method and system including a quantization and coding sub-assembly (38) in which a quantization parameter is controlled by another parameter defined as being in direct relation with the dynamic range value of the data contained in given blocks of pixels. Application: MPEG video decoders.

8 Claims, 11 Drawing Sheets

| | MB line 1 | MB line 2 | | MB line 35 | MB line 36 |
|---|---|---|---|---|---|
| | qs 5-odd | qs 10-odd | | qs 175-odd | qs 180-odd |
| | qs 5-even | qs 10-even | | qs 175-even | qs 180-even |
| | qs 4-odd | qs 9-odd | ... | qs 174-odd | qs 179-odd |
| | qs 4-even | qs 9-even | | qs 174-even | qs 179-even |
| ⋮ | ⋮ | ⋮ | | ⋮ | ⋮ |
| qs 1-odd | qs 2-odd | qs 7-odd | | qs 172-odd | qs 177-odd |
| qs 1-even | qs 2-even | qs 7-even | | qs 172-even | qs 177-even |
| qs 6-odd | | | | qs 171-odd | qs 176-odd |
| qs 6-even | | | | qs 171-even | qs 176-even |

FIG. 19 not required pixels     required pixels

FIG.20

METHOD AND DEVICE FOR DECODING CODED DIGITAL VIDEO SIGNALS

FIELD OF THE INVENTION

The present invention relates to a method of coding digital video data corresponding to the pixels of a sequence of pictures, comprising at least a block forming step, for dividing the input video data into blocks, a quantization and coding step, for quantizing data corresponding to each block and coding the quantized data, and a control step, for controlling a quantization parameter of said quantization and coding step in accordance with another parameter that depends on the content of each block.

The invention also relates, for the implementation of this method, to a system for coding digital video data corresponding to the pixels of a sequence of pictures, comprising at least a block converter, for dividing the input video data associated to one picture into blocks, a quantization and coding sub-assembly, for quantizing data corresponding to each block and coding the quantized data, and a control sub-assembly, for controlling a quantization parameter of said quantization and coding sub-assembly in accordance with a parameter that depends on the content of each block.

Such an invention may be used in the field of digital television, especially according to the MPEG standard (described for instance in the document "MPEG: a video compression standard for multimedia applications", D. Le Gall, Communications of the ACM, April 1991, vol.34, n°4, pp.46–58) and, more generally, is of interest in the field of multimedia applications.

BACKGROUND OF THE INVENTION

Most of MPEG decoders usually comprise an external memory of 16,8 Mbits (1 Mbit=$2^{20}$ bits), or even more when they have to support decoding at main level/main profile. It is known for instance that the incoming bitstream has to be stored in an input buffer (VBV-buffer), the theoretical capacity of which is equal to 1,835 Mbit. However, since a practical decoder cannot decode instantaneously, some additional buffer is required, which increases the input buffer to a capacity of about 2,5 Mbits. Moreover, in order to support a bidirectional motion compensation, the decoder must include two reference frames. The storage capacity for one reference frame is 5 Mbits for 50 Hz systems and 4,1 Mbits for 60 Hz systems. To enable the decoding of both standards, 10 Mbits have therefore to be provided in the decoder for the storage of both reference frames. It must also be recalled that the reconstruction of MPEG video signals after decoding occurs in a macroblock order whereas the information to be displayed is required in an interlaced scanning line format. As the macroblocks are frame coded, the information of both fields has to be delivered during decoding, and the conversion from the frame coded macroblock format to the interlaced scanning line format requires a conversion memory, generally of 5 Mbits or 4,1 Mbits according to the system (50 Hz or 60 Hz). The total memory requirement then becomes equal to (2,5+(3×4,1))=14,8 Mbits for a 60 Hz decoder and to (2,5+(3×5))=17,5 Mbits for a 50 Hz decoder. For this last one, the practical 16 Mbits limit is therefore exceeded.

Moreover, the integrated circuit technology that is to-day available allows to implement other functionalities than video decoding, for example combinations with audio decoding and bidimensional graphics, and next generation MPEG decoders will probably include demultiplexing functions and improved processors. All these additional functions are memory demanding and their performance is determined by the amount of available memory capacity.

In order to solve this problem, it has been added extra memory (of 4 Mbits) to the MPEG decoder, but such a solution is provisional and will be probably obsolete in a near future. More expensive 16 Mbits memories will then be added.

Another proposed solution, described in the document EP 0618722, has consisted in reducing the memory capacity for display conversion. By using the display memory in a macroblock line fashion rather than on field basis, the capacity of the display memory has been reduced from 5 Mbits to about 3,5 Mbits. The memory requirement for 50 Hz MPEG decoders then falls below the practical limit of 16 Mbits, but due to the so-called 3:2 pull down mode the concerned principle cannot be simply applied in 60 Hz systems.

A further reduction in memory capacity, described in the documents EP 0714208 and EP 0716395, has been achieved by doubling the decoding speed in the MPEG decoder. The field lines required for display can then be directly delivered at the appropriate speed, the non required lines from the opposite field being discarded at the end of the decoding process. With this solution, the memory requirement for 50 Hz decoding is about 13 Mbits, and can also be applied in 60 Hz decoders (about 11,1 Mbits). It is however likely that in a near future the memory requirement for MPEG decoders will strongly increase and that the 16 Mbits frontier will be exceeded even for 60 Hz systems.

SUMMARY OF THE INVENTION

A first object of the invention is therefore to propose another type of method for decoding coded digital video signals, in which an increased reduction of memory capacity is further obtained without noticeable picture quality degradation.

To this end the invention relates to a method as defined in the preamble of the description and wherein said dependant parameter is defined according to the dynamic range value of the data of each block, said dynamic range being equal to the difference between the maximum and the minimum value of each block or to a value in direct relation with said difference.

It may be noted that the document EP 0618733 also describes a coding system including a block converter, a quantization and coding sub-system, and a control sub-assembly for modifying a quantization parameter according to some content of each block. However, in that document, the considered content is the distribution, in each block, of the high-frequency significant coefficients obtained after a DCT (discrete cosine transform) carried out on the input video data. This kind of quantization control is intended to lead to a better regulation of the coded information amount, especially in video tape recorders, while the technical solution proposed according to the invention must lead to a higher compression ratio in order to reduce the needed memory capacity.

Another object of the invention is to propose a coding system allowing to carry out said coding method.

To this end the invention relates to a system as defined in the preamble of the description and wherein said system also comprises a third sub-assembly, for the definition of dynamic range values, and a fourth sub-assembly, for a cost computation with respect to possible quantization strategies respectively associated to said range values, followed by a selection of one of these strategies according to a cost criterion related to said cost computation.

Another object of the invention is to propose a decoding method allowing to decode signals that have been coded according to the above-indicated coding method.

To this end the invention relates to a method of decoding digital coded video signals corresponding to the pixels of an original sequence of pictures, comprising at least a decoding step, for decoding said coded signals arranged in blocks, a reconstruction step, for deriving MPEG I, P and B data from said decoded signals, and a format conversion step, wherein said reconstruction step comprises a storing step of said decoded data and, before and after said step, an additional compression step related to the dynamic range value of the data of each block and a corresponding expansion step.

Another object of the invention is finally to proposed a decoding system for carrying out said decoding method.

To this end the invention relates to a system for decoding digital coded video signals corresponding to the pixels of an original sequence of pictures, comprising at least in series a decoding sub-assembly, provided for decoding said coded signals arranged into blocks, an adder receiving on a first input the decoded output signals of said decoding sub-assembly, and a storing stage including two parallel reference memories, provided for the prediction of MPEG P pictures or the bidirectional interpolation of MPEG B pictures and the outputs of which are connected to second and third inputs of said adder, the ouput of said adder being also connected to the input of a conversion memory, wherein said system also comprises before said storing stage additional compression means and after said storing stage corresponding expansion means, said additional compression being related to the dynamic range value of the data of each block.

BRIEF DESCRIPTION OF THE DRAWINGS

The particularities and advantages of the invention will become more apparent from the following description and the accompanying drawings, in which.

DESCRIPTION OF PREFERRED EMBODIMENT

As presented above, the invention is based on a compression of the reference frame information before storage. Two examples of compression methods will be now described. As both methods are based on predictive coding, such a coding process will be first described.

Figure 1:
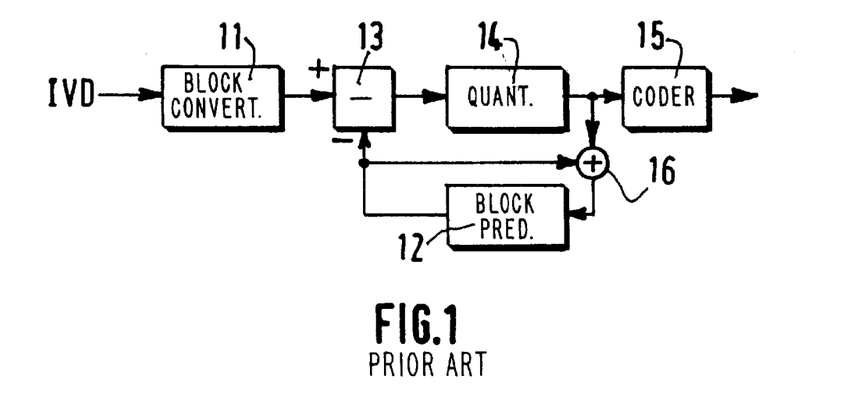
FIGS. 1 and 2 show block-based coding systems in feedback and feed forward cases respectively.
Figures 2, 3:
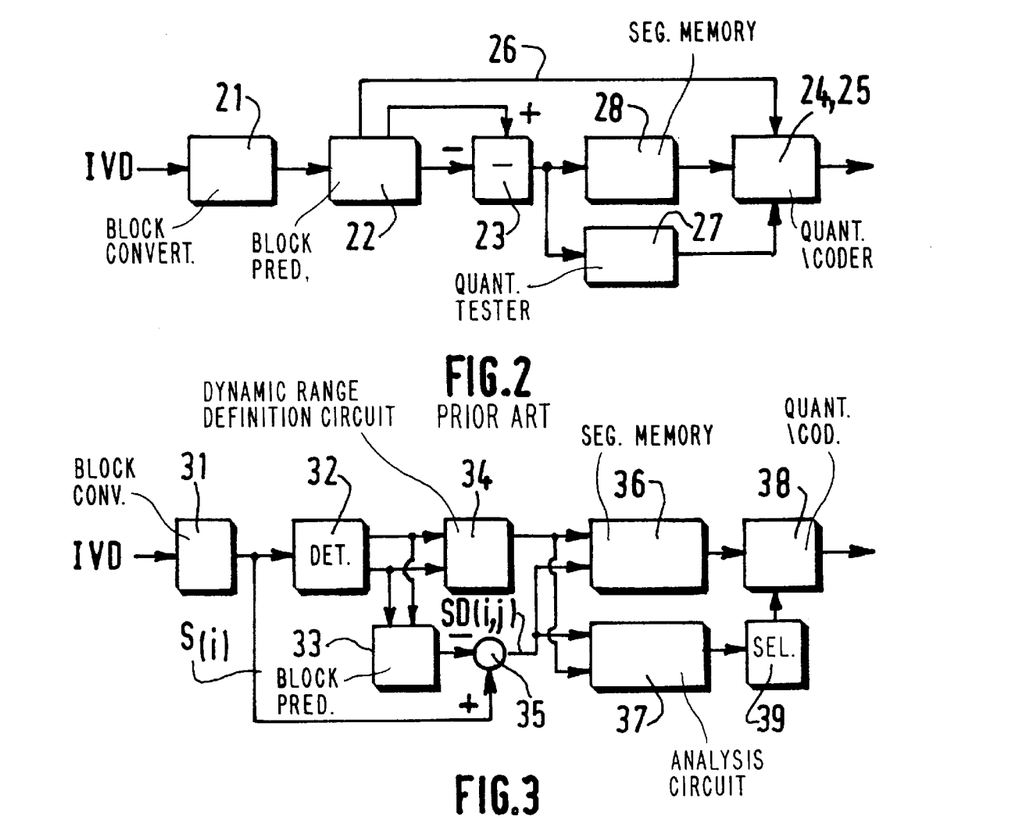
FIG. 3 is an illustration of a feed forward coding scheme for a compression system according to the invention.

FIGS. 1 and 2 depict block-based coding systems in feedback and feed forward cases respectively. In both cases, the incoming video data IVD are converted to blocks in a block converter (11 and 21 respectively), and the content of each block is predicted by a block predictor (12 and 22 respectively). Each predicted sample is then subtracted from the corresponding input sample before prediction (in subtractors 13 and 23 respectively) and only the sample differences are quantized (in quantizers 14 and 24 respectively) and coded (in coders 15 and 25 respectively).

In the feedback case of FIG. 1, the prediction is based on previously quantized blocks (an adder 16 is provided in the feedback loop in order to reconstruct from the sample differences obtained at the output of the quantizer 14 complete samples at the input of the predictor 12). The quantizer 14 yields a fixed bit rate at its output, for example 4 bits/sample instead of 8 bits at its input. In the feed forward case of FIG. 2, the prediction is based on the present set of blocks. The prediction values, available at the output of the predictor 22, have therefore to be transmitted to the decoder, which knows the past only, and to this end a connection 26 is provided between the predictor 22 and the quantizing and coding sub-assembly (24,25). Prior to the final quantization and coding in this sub-assembly, a group of blocks, here called a segment, is analyzed in view of a determination of the optimal quantization. Taking into account the prediction values, this analysis is done in a quantization tester 27 inserted between the output of the subtractor 23 and the sub-assembly (24,25). A segment memory 28 also inserted between said subtractor 23 and sub-assembly (24,25) allows to delay the sample differences by a duration sufficient for a complete analysis of the whole current segment, in order to find a quantizer strategy yielding a fixed bitrate per segment. While reading out the stored segment, this optimal quantizer strategy is carried out. If a fixed bitrate is used, the segment memory is no longer necessary and can then be omitted. In the following only a feed forward coding system will be considered, because it gives the highest picture quality (and allows a local access to the block data).

For block-based prediction, several kinds of predictors are attractive because of their simplicity. In the MPEG case, a compromise may be made between the best prediction, provided by way of a sample average (SUMS(i)) for all sample indexes i within the block, and a very simple one that consists in selecting among all the samples of the block the lowest one (MINS(i)): the prediction, efficient if the block size is not too large, is obtained by selecting and averaging the sum of the lowest sample value (or minimum MINS(i)) and the largest one (or maximum MAXS(i)). The dynamic range of the sample differences that have to be coded, which is defined by the maximum sample value minus the minimum one, may change from block to block. The coder then adapts the quantizer as a function of this dynamic range. This technique is called Adaptive Dynamic Range Coding, or ADRC.

An illustration of a feed forward coding scheme of an ADRC compression system is shown in FIG. 3. The incoming video data IVD are converted to blocks in a block converter 31, with a block geometry that may be choosen either symmetrically or asymmetrically (for instance 4×4, or 2×8, or 1×16, for blocks of typically 16 pixels). The converter 31 is followed by a detector 32 that selects the lowest sample value of each block (=the minimum MINS(i)) and the largest one (=the maximum MAXS(i)). In a block predictor 33 provided at the output of the detector 32, a prediction of each block is then determined by calculating the average between said minimum and maximum values, dividing by two and rounding the result. These minimum and maximum values are also sent to a dynamic range definition circuit 34 that carries out the subtraction of the maximum value with the minimum one.

The obtained dynamic range (for instance in 8-bit resolution if both minimum and maximum amplitudes have such a resolution) is then used for controlling the quantizer choice in the compression system, as explained hereunder (for example, when an edge is inside a block, the dynamic range is large and more coarse quantization is allowed). As the number of different dynamic range values is rather large and the decoding part has to know (in an expanding system corresponding to the compression system) which range was used for quantization, this dynamic range parameter is divided into classes, eight in the present case. Two examples (1) and (2) of such a division are given in the following table:

TABLE 1

| Dynamic (1) | range (2) | Class number |
|---|---|---|
| 0–1 | 0–1 | 0 |
| 2–3 | 2–5 | 1 |
| 4–7 | 6–11 | 2 |
| 8–15 | 12–27 | 3 |
| 16–31 | 28–59 | 4 |
| 32–63 | 60–119 | 5 |
| 64–127 | 120–239 | 6 |
| 128–255 | 240–255 | 7 |

It must be noted that the transitions between those classes determine the compression performance and depend on the chosen prediction method (and the quantization parameter) in the first example of the table (averaging (MINS(i)+MAXS(i))/2), the transitions correspond to real binary numbers, while with a prediction from the block minimum (second example of the table) those transitions are at slightly different positions.

In order to carry out this principle according to the invention, groups of blocks are temporarily stored in a memory 36 provided at the output of the dynamic range definition circuit 34, each group being called a segment (a typical size of a segment may be about 100 ADRC blocks of 16 samples, i.e. a few MPEG macroblocks in the case of the MPEG standard). In the same time, said group is analyzed in an analysis circuit 37 provided in parallel with said memory 36, in order to find an optimum quantization scheme. The segment memory 36 and the analysis circuit 37 both receive the same inputs, i.e. the output of the dynamic range definition circuit 34 and the output of a subtracter 35 subtracting the output of the block predictor 33 from each sample S(i) available at the output of the block converter 31. The sample differences SD(i,j) within one ADRC block j are then virtually quantized, that is to say one computes in the analysis circuit 37 the output bit cost when a particular quantizer would be chosen. In the present case, 8 different quantization strategies, all based on uniform quantizers, have been used, according to the formulas:

$$QSD(i,j) = (SD(i,j)/QSTEP) + 0.5 \quad (1)$$

$$RSD(i,j) = QSD(i,j) \times QSTEP \quad (2)$$

in which QSD(i,j) designates the quantized sample difference, RSD(i,j) the reconstructed sample value, and QSTEP an integer number (for instance in the present case a power of 2) giving the length of the quantizer intervals. The bit cost computation can be derived from a table such as the following one, corresponding to 8 strategies in parallel:

TABLE 2

| Dynamic range class | Strategy bit costs | | | | | | | |
|---|---|---|---|---|---|---|---|---|
| | 0 | 1 | 2 | 3 | 4 | 5 | 6 | 7 |
| 0 | 1 | 0 | 0 | 0 | 0 | 0 | 0 | 0 |
| 1 | 2 | 1 | 1 | 0 | 0 | 0 | 0 | 0 |
| 2 | 3 | 2 | 2 | 1 | 1 | 0 | 0 | 0 |
| 3 | 4 | 3 | 2 | 2 | 1 | 1 | 0 | 0 |
| 4 | 5 | 4 | 3 | 3 | 2 | 2 | 1 | 1 |
| 5 | 6 | 5 | 4 | 4 | 3 | 2 | 2 | 1 |
| 6 | 7 | 6 | 5 | 5 | 4 | 3 | 3 | 2 |
| 7 | 8 | 7 | 6 | 6 | 5 | 4 | 3 | 3 |

As the memory stores a whole segment, i.e. a group of blocks, the bit cost for a block is 16 times the number within the appropriate column of the above-indicated bit cost table, and the individual block costs are then accumulated to give a bit cost per segment for each of said strategies.

The control of the quantization is the following. When the first sub-assembly including the detector 32, the block predictor 33, the definition circuit 34 and the subtractor 35 has allowed to define the range values, a second sub-assembly including the memory 36, the analysis circuit 37 and a selector 39 carries out for each group of blocks (stored in the memory 36) a cost computation with respect to each of the possible quantization strategies respectively associated to the range values (this computation being carried out in the circuit 37) and a subsequent selection (by means of the selector 39) of the strategy corresponding to the lowest computed cost. This strategy is then carried out in a quantizing and coding sub-assembly 38.

The quantizing part of the sub-assembly 38 is based on the above-given equations (1) and (2), about which it can be recalled that they have a linear form (adding operations, or multiplying ones with adaptive constants). Since compression and decompression steps are performed many times in case of MPEG systems, each error related to the direct coefficient (DC) should be obviously prevented in the quantization process, for examples thanks to a small sign dependent correction allowing to guarantee a fully symmetrical quantization characteristic. Finally the number of levels at the output of the quantizer is defined by a table, such as the following one (also corresponding to the eight same strategies 0 to 7):

TABLE 3

Quantizer step size (dynamic range)

| Dynamic range class | 0 | 1 | 2 | 3 | 4 | 5 | 6 | 7 |
|---|---|---|---|---|---|---|---|---|
| 0 | 1 | 2 | 2 | 4 | 4 | 4 | 4 | 4 |
| 1 | 1 | 2 | 2 | 4 | 4 | 8 | 8 | 8 |
| 2 | 1 | 2 | 2 | 4 | 4 | 8 | 8 | 8 |
| 3 | 1 | 2 | 4 | 4 | 8 | 8 | 8 | 8 |
| 4 | 1 | 2 | 4 | 4 | 8 | 8 | 16 | 16 |
| 5 | 1 | 2 | 4 | 4 | 8 | 16 | 16 | 32 |
| 6 | 1 | 2 | 4 | 4 | 8 | 16 | 16 | 32 |
| 7 | 1 | 2 | 4 | 4 | 8 | 16 | 32 | 32 |

An example of use of the tables can be given. For instance for class 6, first example (1) of division, and strategy 3, the dynamic range is between 64 and 127 (TABLE 1) which could cost 7 bits prior to quantization (which is then equivalent to strategy 0, according to TABLE 2). With a quantizer step of 4, the result is between 16 and 31 (TABLE 1), which requires a coding in 5 bits (TABLES 2 and 3 give QSTEP=4 and bit cost=5 at the location corresponding to "class 6/strategy 3"). These tables, which may require a different content depending on the nature of the signal to be compressed and the compression factor to be realized, are only examples, but the performance of the whole compression (and decompression) system is determined by them. In an MPEG decoder, they may be implemented as down loadable tables which can be adapted dynamically by the system controller.

The coding part of the sub-assembly 38 then covers the mapping of output levels of its quantizing part to a bit pattern, and the resulting data are multiplexed with other data that have to be sent to the decoding part for reconstruction (inter alia, the value of the strategy, which is transmitted once per segment). The format per block contains the block prediction, the dynamic range class and the quantized differences.

Figure 4:
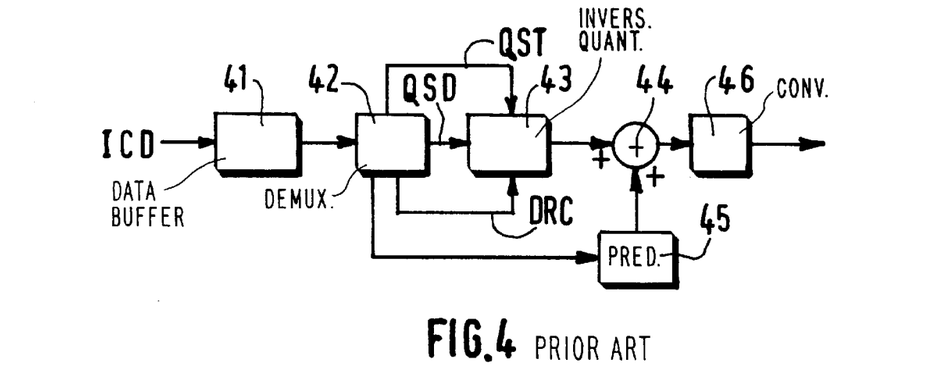
FIG. 4 shows a simplified, conventional block predictive video decoder, FIG. 5 such a decoder in the MPEG case, FIG. 6 a similar scheme when the invention is applied to such a video decoder and FIG. 7 a corresponding timing diagram for a sequence of coded pictures that have to be decoded with said decoder according to the invention.

While FIGS. 1 to 3 were related to the encoding process, the basic principle of the invention may also be applied during the decoding process. FIG. 4 shows a block diagram related to a simplified, conventional block predictive decoder. The input coded data ICD, recovered (after the transmission and/or storing step of the data coded at the encoding side) from a memory (in an MPEG case, from one of the two MPEG reference memories) are sent to a data buffer 41 having the size of a few data blocks or of a segment (a group of blocks). The coded data are demultiplexed in a demultiplexing circuit 42, the demultiplexed information being the quantization strategy QST, the dynamic range class DRC and the quantized sample differences QSD. These quantized sample differences QSD are sent to an inverse quantizer 43 in which the quantizers levels are translated, with the aid of the quantizer step size and bit cost tables, to individual sample differences, that are then added in an adder 44 to the output signals of a predictor 45 matching with that of the encoder. The video samples available at the output of the adder 44 are finally converted in a format converter 46 to the required video format.

Figure 5:
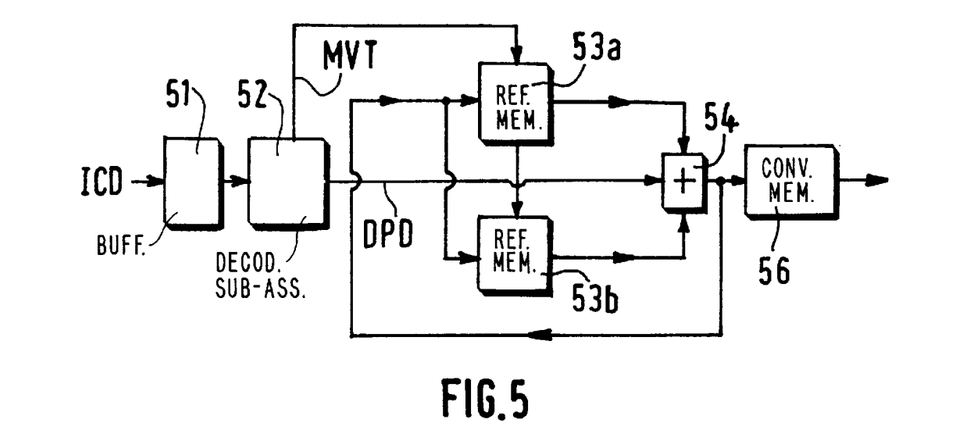

In the MPEG case, corresponding to FIG. 5, the block diagram of a video decoder is the following. The input coded data ICD, stored in an input buffer 51, are then decomposed into pixel data DPD and motion vectors MVT and decoded in a decoding sub-assembly 52. The pixel data DPD available at the output of said sub-assembly are processed according to the type of the frames:

(a) for predictively coded frames (P frames), the decoded pixel data are added in an adder 54 to predicted data coming from one of the two reference memories (53a or 53b) of the MPEG decoder and controlled by a corresponding motion vector MVT, and the result at the output of the adder 54 is stored in the other reference memory (53b or 53a);

(b) for bidirectionally interpolated frames (B frames), vector controlled predicted data from both reference memories 53a and 53b are added to the decoded pixel data DPD;

(c) for intra coded frames (I frames), the pixel data, representing full display pixels, are conventionally decoded (at this end the decoding sub-assembly 52 includes a variable-length decoder, an inverse quantizing circuit and an inverse discrete cosine transform circuit) and stored in one of the two reference memories 53a and 53b, no other data being in this case added to the decoded data DPD.

Whatever the type of frame, the output of the adder 54 is supplied via a conversion memory 56 to the output of the decoder, for display.

Figure 6:
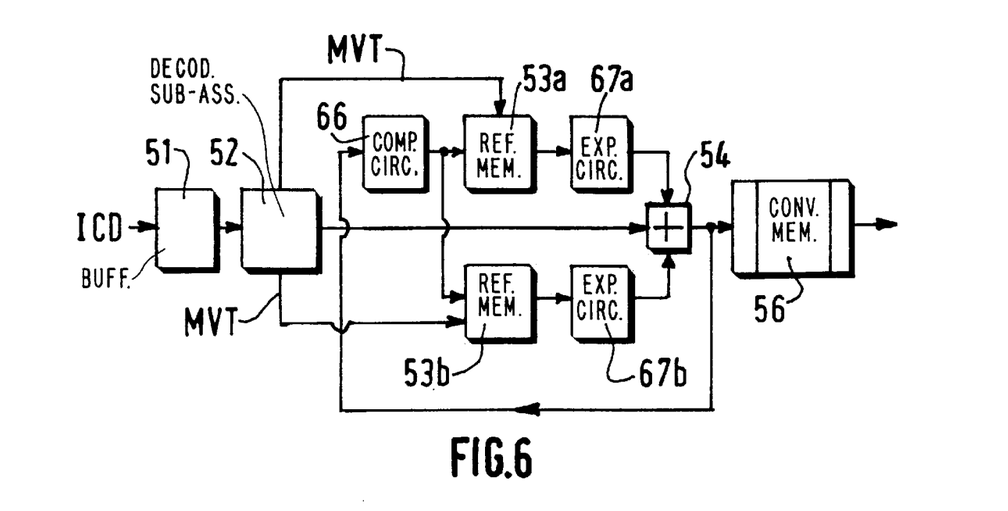
Figure 7:
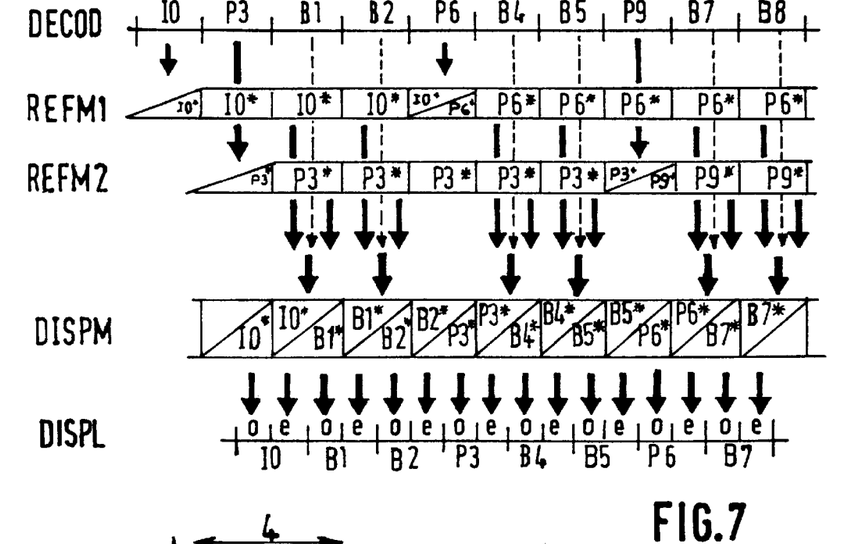

When ADRC is applied to such a video decoder, the block diagram of FIG. 5 is modified as shown in FIG. 6; all data to be stored in referenced memories (53a, 53b) are compressed in an ADRC compression circuit 66 (such an ADRC compression circuit 66 comprises circuits similar to the elements 39 and 32 to 37 as previously described in relation with the implementation of the invention at the encoding side), and all data to be retrieved from those memories are expanded in ADRC expanding circuits (67a, 67b) before any other processing takes places (such expanding circuits then carrying out the inverse operations). A corresponding timing diagram is shown in FIG. 7 for a sequence of coded pictures $I_0$, $P_3$, $B_1$, $B_2$, $P_6$, $B_4$, $B_5$, $P_9$, $B_7$, $B_8$ (corresponding to an original sequence $I_0$, $B_1$, $B_2$, $P_3$, $B_4$, $B_5$, $P_6$, $B_7$, $B_8$, $P_9$, . . . , before coding and modification of the order of the data in view of the bidirectional interpolation of B pictures). This sequence of coded pictures and the decoded data are in the same order, and therefore only the second ones are shown in the first line (DECOD) of FIG. 7. The second line REFM1 (reference memory) designates the decoded data that are stored in one of the two reference memories (for instance 53a): $I_0$, $P_6$, . . . , while the third line REFM2 indicates the decoded data $P_3$, $P_9$, . . . stored in the other one 53b. The arrows between the first and second lines and between the first and third lines respectively indicate the ADRC compressions carried out in the compression circuit 66, before the storing steps in the memories 53a and 53b. This compression step is followed at the output of said memories by corresponding ADRC expansions carried out by the circuits 67a and 67b and designated by the arrows coming either from the second line REFM1 or from the third one REFM2. The dotted arrows coming from the first line DECOD correspond to the B pictures interpolated thanks to the reference pictures stored in the memories 53a and 53b.

If the display conversion is performed by means of a field or frame memory, this memory may also be surrounded, as schematically indicated in FIG. 6, by ADRC compression and expansion circuits similar to the circuit 66 or the circuits (67a, 67b) respectively. If provided, this ADRC compression is then indicated by the arrows arriving to the fourth line DISPM (display memory) of FIG. 7, and the arrows going from this fourth line to the fifth one DISPL (display) correspond to the associated ADRC expansion. Said fourth line shows the content of the display memory, in the form of successive fields obtained from the reference data $I_0$, $P_3$, $P_6$, $P_9$, . . . , successively stored in the reference memories, or from the interpolated data $B_1$, $B_2$, $B_3$, $B_4$, $B_5$, $B_6$, $B_7$, . . . , and said fifth line shows the pictures $I_0$, $B_1$, $B_2$, $P_3$, $B_4$, $B_5$, $P_6$, $B_7$, . . . successively displayed (in the same order as the original one) in an interlaced manner (odd, even). Obviously it is possible to implement in this decoding scheme only one of the two ADRC compressions/expansions. As can be seen from the timing diagram of FIG. 7, it must be noted that the compression circuitry for all storage actions may be used in time multiplex so that only one compression circuit is really required.

Figure 8:
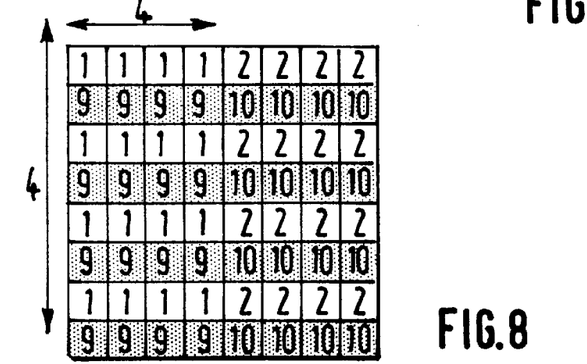
FIGS. 8 and 9 show two block organizations that are convenient in the case of a decoder according to the invention.
Figure 9:
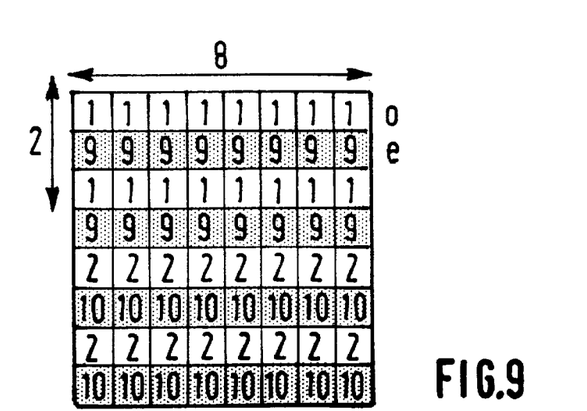
Figure 10:
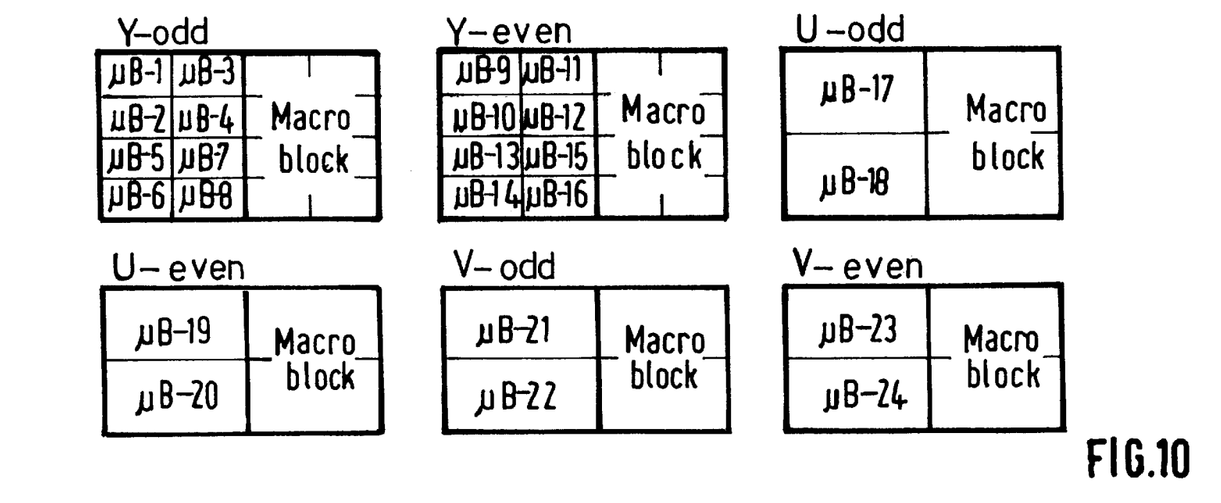
FIG. 10 depicts a possible arrangement of such blocks within an MPEG macroblock.

In all these situations, each ADRC step preferably operates on basis of blocks of 16 pixels, which is adapted to the 8×8 DCT block size observed in MPEG standard (as motion prediction and display data are retrieved on field basis in this standard, by applying the ADRC compression(s)expansion (s) on field basis, the memory access requirements are minimized). Within this MPEG system, two ADRC block organizations may then be proposed, as shown in FIGS. 8 and 9 (the pixels belonging to the difference ADRC blocks are indicated by 1, 2, 9 and 10 in accordance to an introduced sub-block numbering): both have the same geometry but the second one is preferred in the MPEG case because of the higher correlation of horizontally adjacent pixels. Moreover, as the decoded reference data in an MPEG decoder arrive in a macroblock order at the ADRC compression circuit, the relation between ADRC blocks and MPEG macroblocks is important: a possible arrangement of 2×8 ADRC blocks (indicated by $\mu$B) within a 16×16 MPEG macroblock showing is depicted in FIG. 10 (1×8 ADRC blocks for each of the odd and even fields of the luminance Y, and similarly 1×8 ADRC blocks for the chrominance). As can be seen, 24 ADRC blocks ($\mu$B blocks) are located in one macroblock. Other constellations are however possible within a macroblock, an important point being the need to optimize this constellation in view of a minimum access requirements in case of MPEG's motion prediction.

Figure 11:
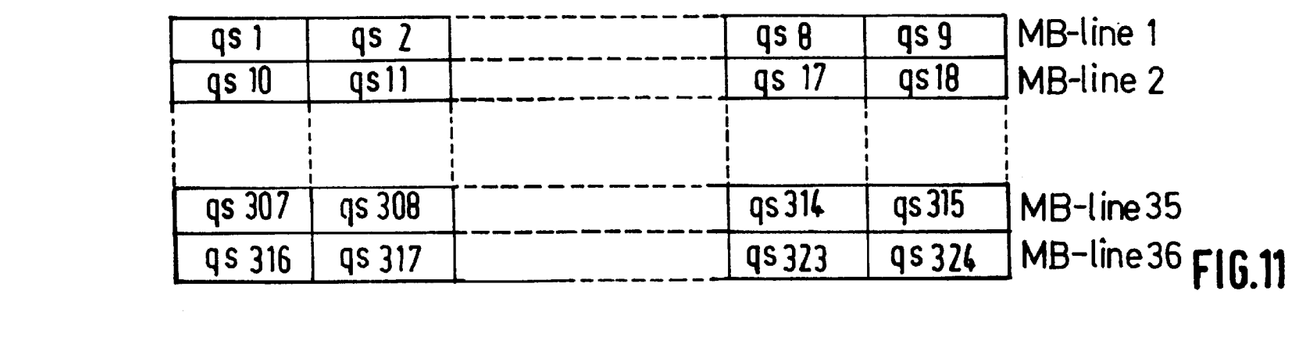
FIG. 11 shows for a main level 50 Hz picture a frame based mapping of quantizer segments, and FIG. 12 a field base mapping.
Figure 12:
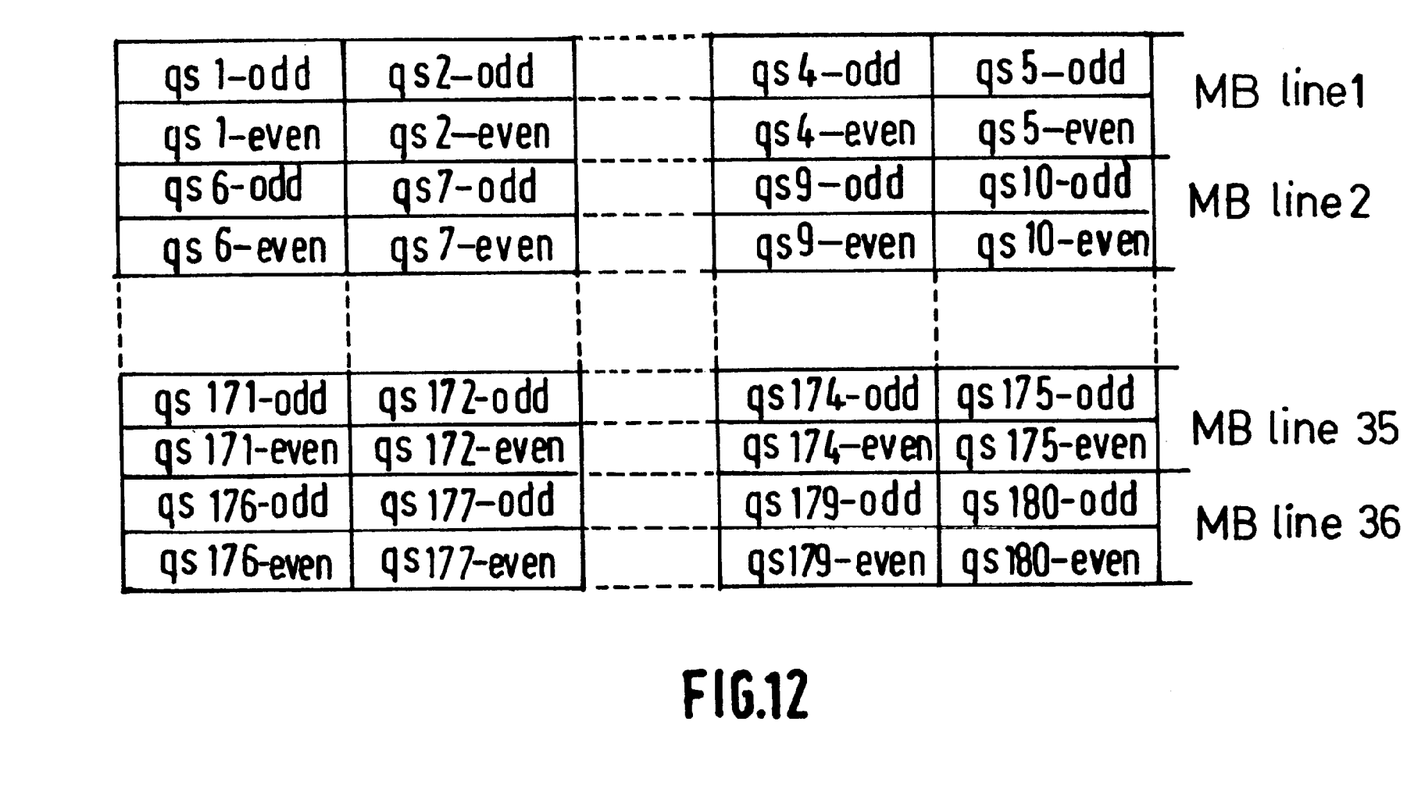

A second ADRC parameter is the segment length, since the optimal quantizing strategy is chosen in relation with it. Segments of about 100 ADRC blocks have been considered as a good choice, which implies 4 or 5 macroblocks in the MPEG case. Taking into account that all the macroblocks have to be accessible individually on basis of horizontal and vertical motion vectors, and in order to match the segment to the coded picture size, the number of segments per macroblock line will be an integer number (here, 9), as shown in FIG. 11 if one chooses the quantizer segment equal to 5 macroblocks for a main level/main profile MPEG decoder with 720 pixels per line (and therefore 45 macroblocks on one macroblock line) and a quantization performed on frame basis. In case said quantization is performed on field basis, the resulting structure is shown in FIG. 12.

Figure 13:
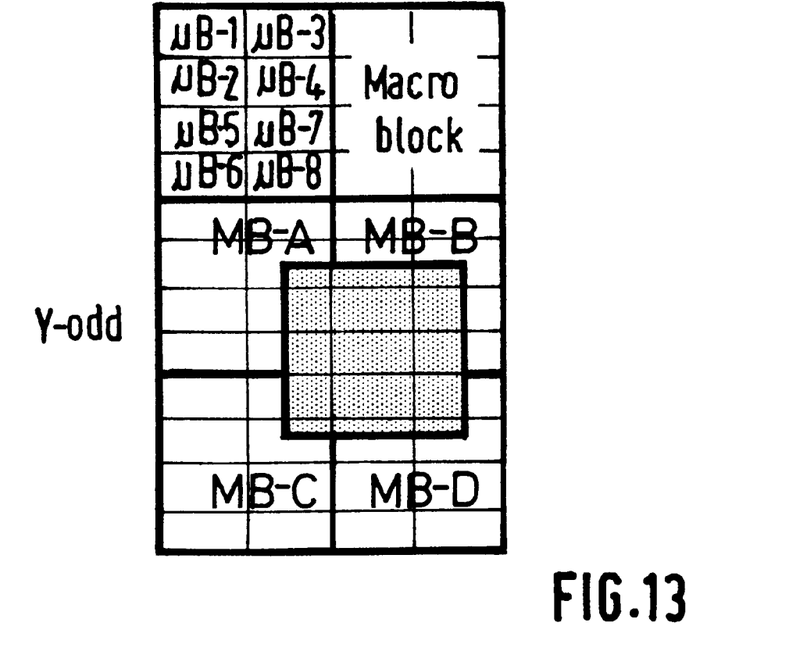
FIGS. 13 and 14 show for luminance and chrominance an example of prediction area in the MPEG case.
Figure 14:
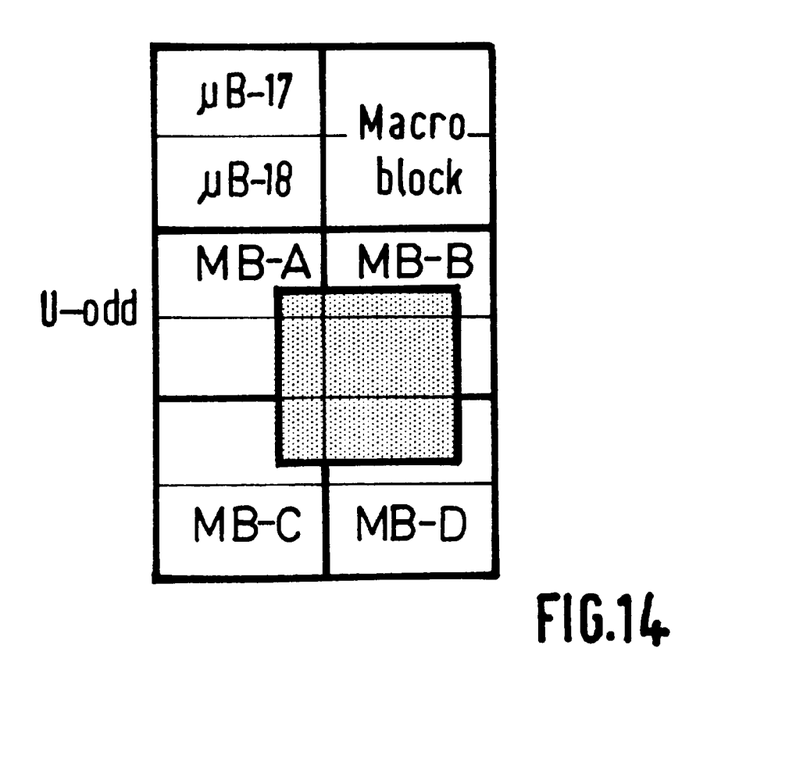

A noticeable difference between the ADRC solution in MPEG case and the conventional video systems relates to the vector controlled access for motion prediction (that takes place on macroblock basis, with a pixel or sub-pixel accuracy). An example of odd field luminance prediction is given in FIG. 13 (and of chrominance prediction in FIG. 14). As can be seen, ADRC blocks from four different macroblocks are required for prediction, but not all the ADRC blocks within these macroblocks are used. In order to limit the overhead in memory access to a minimum, all ADRC blocks will be individually accessible, and the number of accesses has even to be further reduced if also subsets of pixels within an ADRC block can be accessed.

For an MPEG decoder with a by-16 organized external memory, the ADRC principle previously described operates on blocks of 16 pixels with a bit cost, after compression, comprised between 0 and 8 bits per pixel. Thus one ADRC block occupies between 0 and 8 memory words of 16 bits, and a possible mapping of pixel data onto the memory is then given in FIG. 15, that indicates for all values of bit cost an example of storage format for the compressed pixel data in the external memory, while FIG. 16 recalls the relation between pixel numbers and spatial positions in a 2×8 ADRC block.

Figure 17:
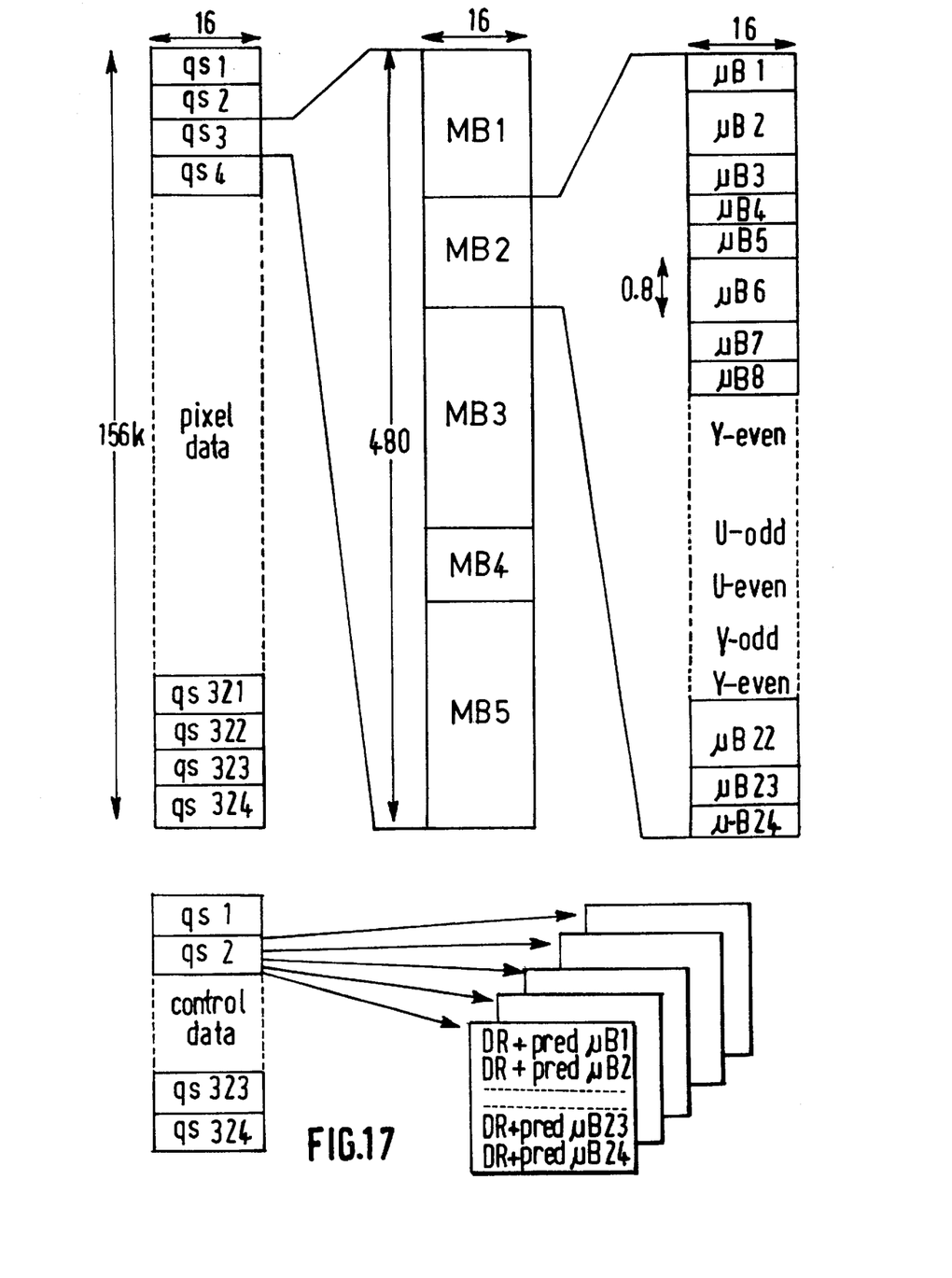

When taking into account the additional data that have to be also stored (besides pixel data are indeed provided some control data on dynamic range class and prediction values), a possible overall global format in said external memory, supposed to be 16 bit wide, is then given in FIG. 17. As can be seen in this figure, the real pixel data are separated from the control data DR and pred, since in case of variable compression rates the pixel storage area changes whereas the control data are fixed. As also seen in FIG. 17, the quantization strategy search is performed on frame basis on five consecutive macroblocks MB1 to MB5 (said search being made for quantizer segments qs1, qs2, qs3, . . . , qs323, qs324), and the fixed length of each data packet of five macroblocks (=5×24 ADRC blocks) is equal to 480 words in the described example, which implies for the real pixel data a compression ratio of 2 or a coding efficiency of 4 bits/pixel. By changing the target length of the compressed pixel data field, said compression ratio may be made variable, for instance between 1 and 3 which implies data packet size between 960 (no compression) and 320 memory words respectively.

Since first the control data remain fixed (while the pixel storage area changes), and also because both data DR (concerning the dynamic range) and pred (respectively 3 bits and 8 bits in the present case) do not fit to the 16 bit wide memory organization, these data are stored, as shown in FIG. 17, in a separate memory area (for these control data, corresponding to 11 bits per ADRC block, i.e to 0,7 bit/pixel, the real compression ratio is 1,7 instead of 2 in the given example).

Moreover, in order to support motion compensation at a minimum access rate, the ADRC blocks within a quantizer segment qs should be individually accessible, for example by reading all 5×24 DR values, translating them to a bit cost and adding these individual bit cost values in order to find the access point for each ADRC block (this requires some memory accesses and computations and, in this case, it is obvious that DR values should be stored separate from the prediction values pred). Another possibility is to calculate the start address of each individual ADRC block during compression and store these full addresses as control data in the memory (this costs 10 bits per ADRC block, or 0,6 bit/pixel). Practically an optimum has to be found between the number of memory accesses and the required storage capacity.

Figure 18:
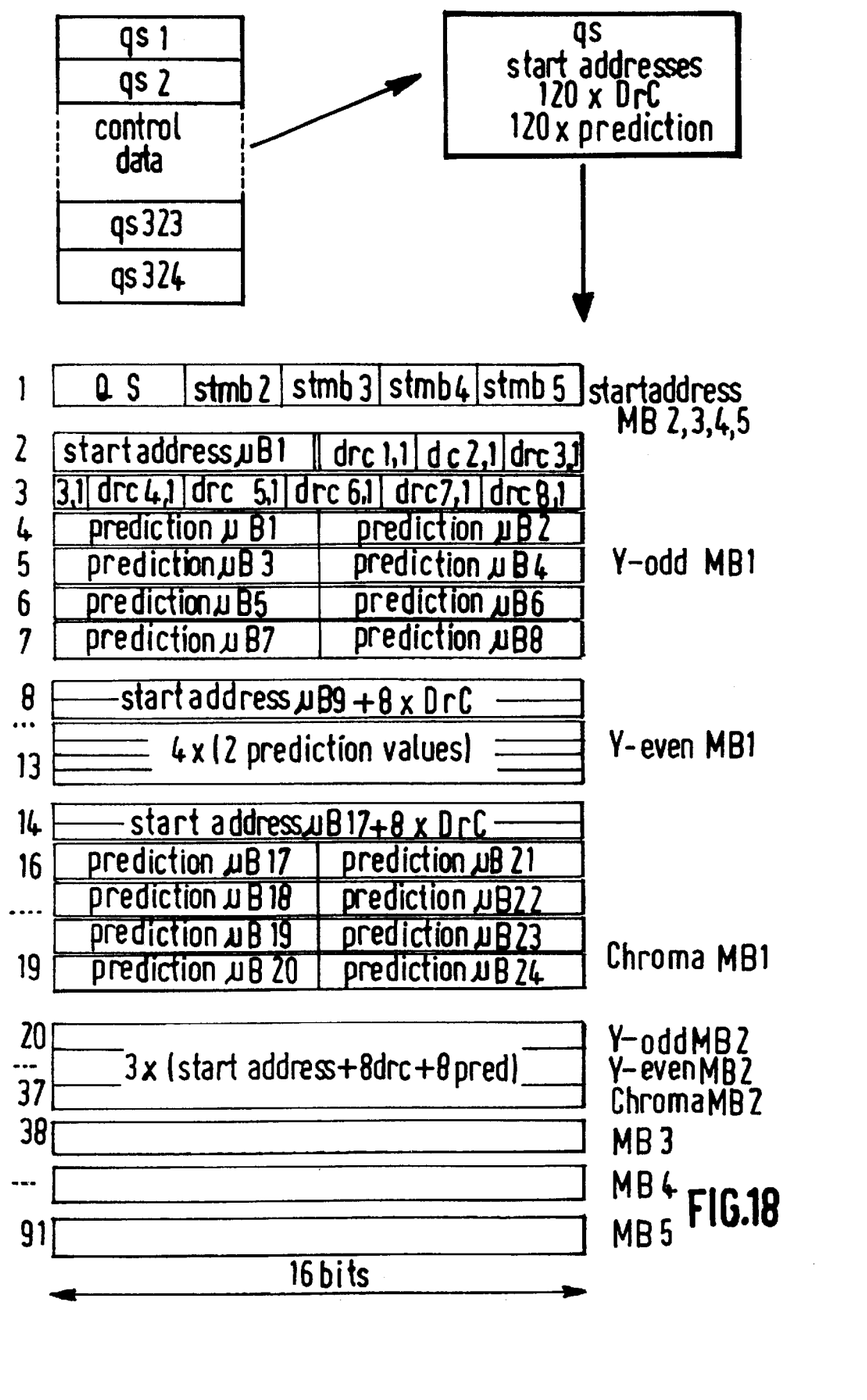
FIG. 18 gives an example of storage of ADRC control data in the external memory.

An example for the storage of ADRC control data in the 16 bit wide organized external memory is shown in FIG. 18, according to a three steps approach (1) for each quantizer segment qs1 to qs324, the quantizer strategy QS (that can be coded up to 4 bits; mostly 3 bits practically) and the start position stmb (or start adress, only coded in 3 bits) for the macroblocks 2 to 5 are stored in one memory word (the start position stmb1 of the first macroblock of each segment needs not to be coded since it is located at the very beginning of the data packet);

(2) each macroblock (MB1, MB2, MB3, MB4, MB5) is split into three groups (three groups, because often luminance data of one field and chrominance data of both fields are needed) of 8 ADRC blocks representing the information for Y-odd, Y-even (luminance) and for the chrominance, and, for each one of said group, the start address and the dynamic range class drc of the eight concerned ADRC blocks are stored in two memory words;

(3) the prediction of two ADRC blocks (1,2; 3,4; 5,6; 7,8) are combined into one memory word, and also stored in a separate memory area (for the luminance, the predictions of two vertically adjacent ADRC blocks are combined, whereas for the chrominance the predictions of U and V of the same spatial position are combined).

Figure 19:
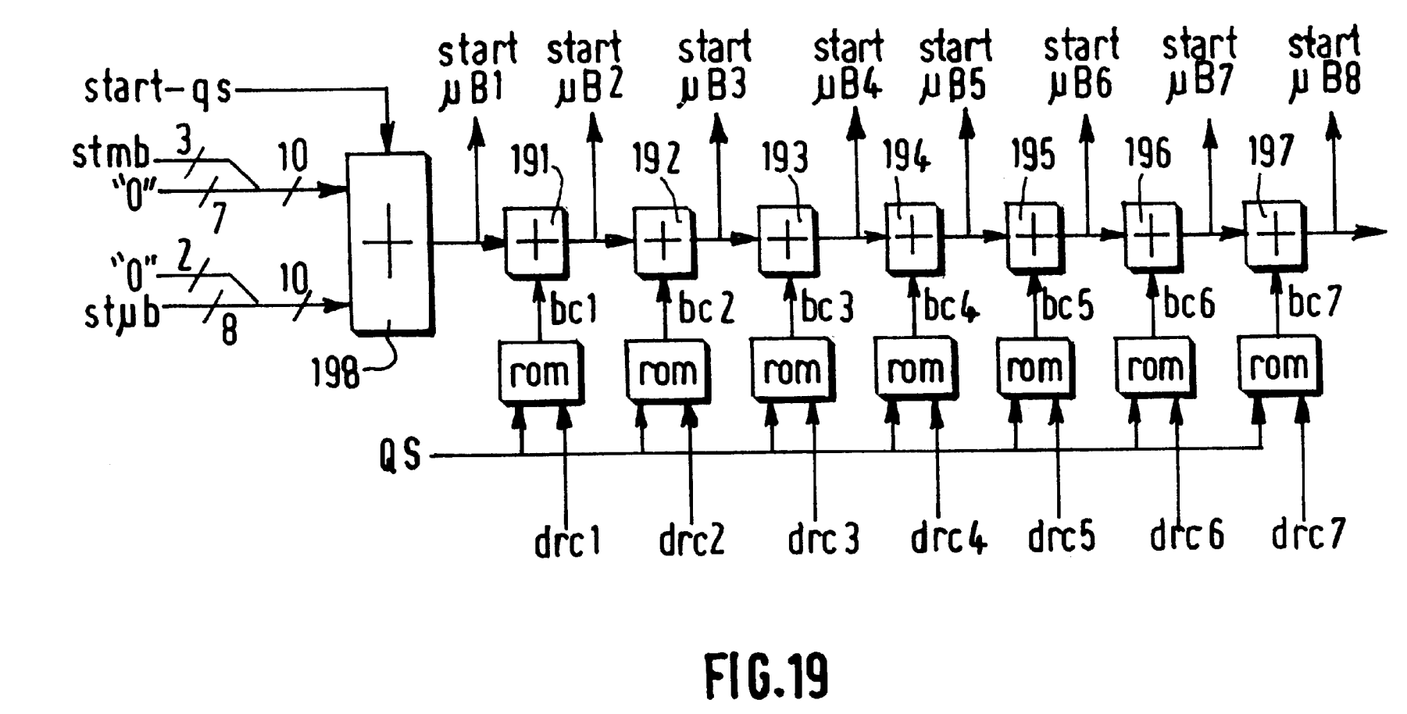
FIG. 19 illustrates how the invidual start addresses of the ADRC blocks are calculated for the data retrieval.

For the data retrieval, FIG. 19 allows to understand how the start addresses of the ADRC blocks are calculated. The DR values drc1 to drc7 are translated (in a memory rom and with the aid of the quantizer strategy QS) into a bit cost (bc1 to bc7) that represents the number of memory words for the concerned ADRC block. By adding (thanks to the adders 191 to 197) the individual bit costs, each entry within the group of ADRC blocks can be found. To find the absolute address, the anchor address of the 5MB large qs area has still to be added (adder 198). It may be noted that since these operations are macroblock based, the rom and adder blocks (rom1 to rom7; adders 191 to 197) can be used sequentially and need only to be implemented once.

Figure 15:
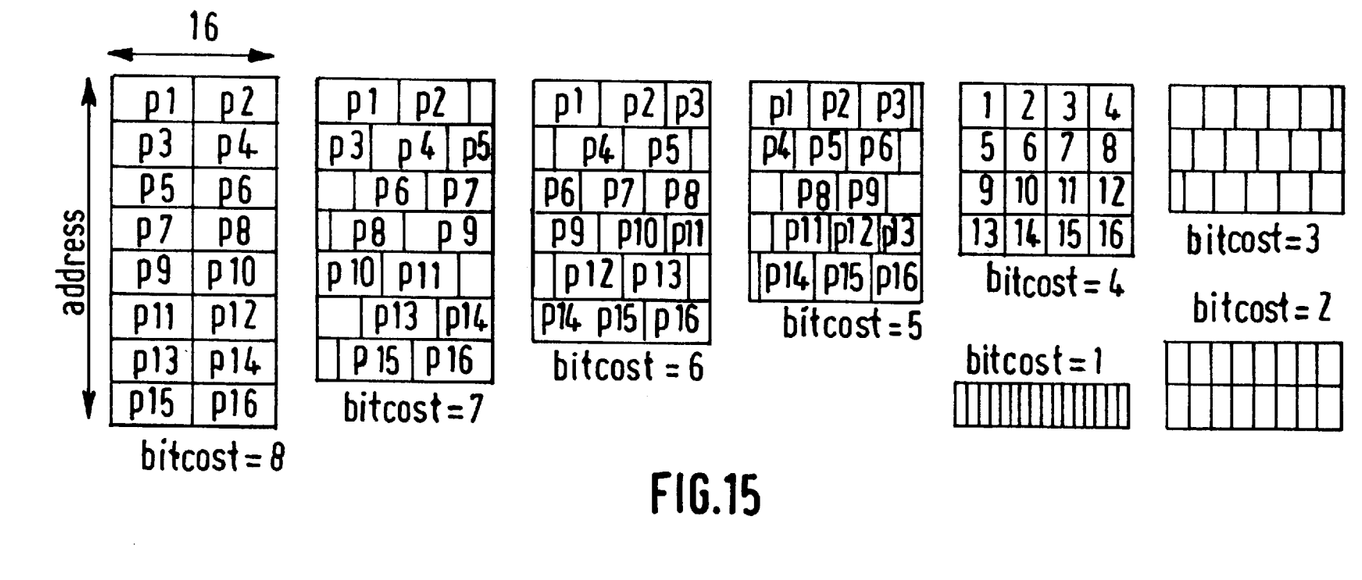
FIG. 15 gives, for every value of bit cost between 0 and 8 bits per pixel, an example of storage format for the compressed pixel data in the external memory, for a relation between pixel numbers and spatial positions in 2×8 ADRC blocks given by FIG. 16, and FIG. 17 gives an example of possible overall global format in said external memory when taking into account the additional control data that have to be also stored.
Figure 16:
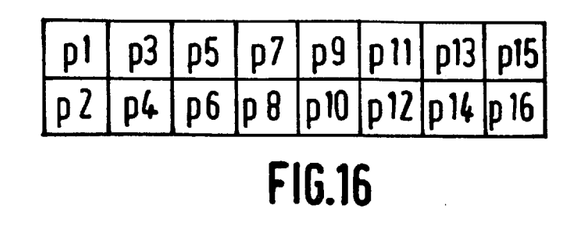
Figure 20:
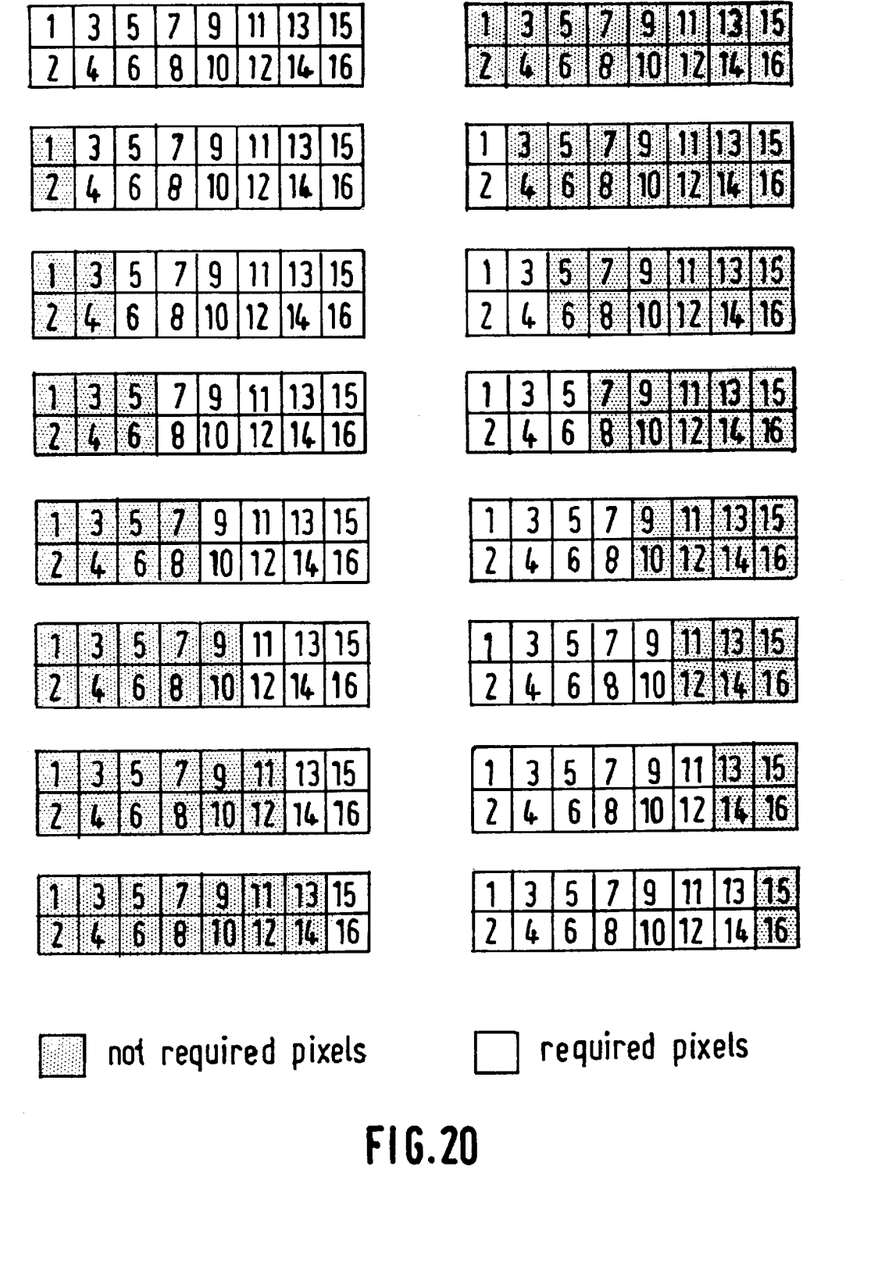
FIG. 20 is an illustration of possible partial accesses of ADRC blocks, provided in order to prohibit unnecessary accesses in the external memory.

In order to prohibit unnecessary accesses to the external memory, ADRC blocks can be accessed partly in most cases. As shown in FIG. 20, 16 partial accesses, limited to pixel pairs due to the vertical grouping of pixels within an ADRC block, are possible. The mapping of those pixels in the external memory depends on the bit cost as shown in FIG. 15.

What is claimed is:

1. A method of coding digital video data corresponding to the pixels of a sequence of pictures, comprising at least a block forming step, for dividing the input video data into blocks, a quantization and coding step, for quantizing data corresponding to each block and coding the quantized data, and a control step, for controlling a quantization parameter of said quantization and coding step in accordance with another parameter that depends on the content of each block, wherein said dependant parameter is defined according to a cost computation of possible quantization strategies for a dynamic range value of the data of each block, said dynamic range being equal to the difference between the maximum and the minimum value of each block or to a value in direct relation with said difference.

2. A system for coding digital video data corresponding to the pixels of a sequence of pictures, comprising at least a block converter, for dividing the input video data associated to one picture into blocks, a quantization and coding sub-assembly, for quantizing data corresponding to each block and coding the quantized data, and a control sub-assembly, for controlling a quantization parameter of said quantization and coding sub-assembly in accordance with a parameter that depends on the content of each block, wherein said system also comprises a third sub-assembly coupled between said block converter and said quantization and coding sub-assembly, for the definition of dynamic range values of each block, and a fourth sub-assembly coupled between said block converter and said quantization and coding sub-assembly, for a cost computation with respect to possible quantization strategies respectively associated to said range values of each block, followed by a selection of one of these strategies according to a cost criterion related to said cost computation.

3. A coding system according to claim 2, in which said third sub-assembly comprises a detector for selecting the lowest and largest values of each block of the considered picture, a predictor, for determining for each of said blocks the average between said values, dividing it by two and rounding the result, a dynamic range definition circuit, for subtracting said maximum value with the minimum one, a subtracter, for defining the difference between the output of said predictor and each sample available at the output of the block converter, a memory, for storing the blocks by groups called segments, said fourth sub-assembly includes an analysis circuit, for computing a cost for each of said quantization strategies, and a selector, for choosing the quantization strategy corresponding to the lowest computed cost.

4. A coding system according to anyone of claim 2, wherein, each picture being subdivided into MPEG macroblocks, each macroblock comprises an integer number of ADRC blocks.

5. A method of decoding digital coded video signals corresponding to the pixels of an original sequence of pictures, comprising at least a decoding step, for decoding said coded signals arranged in blocks, a reconstruction step, for deriving MPEG I, P and B data from said decoded signals, and a format conversion step, wherein said reconstruction step comprises a storing step of said decoded data and, before and after said storing step, an additional compression step related to a cost computation of possible quantization strategies for a dynamic range value of the data of each block and a corresponding expansion step.

6. A system for decoding digital coded video signals corresponding to the pixels of an original sequence of pictures, comprising at least in series a decoding sub-assembly, provided for decoding said coded signals arranged into blocks, an adder receiving on a first input the decoded output signals of said decoding sub-assembly, and a storing stage including two parallel reference memories, provided for the prediction of MPEG P pictures or the bidirectional interpolation of MPEG B pictures and the outputs of which are connected to second and third inputs of said adder, the ouput of said adder being also connected to the input of a conversion memory, wherein said system also comprises before said storing stage additional compression means and after said storing stage corresponding expansion means, said additional compression being related to a cost computation of possible quantization strategies for a dynamic range value of the data of each block.

7. A decoding system according to claim 6, wherein said additional compression means comprise a first sub-assembly, provided for the definition of said dynamic range values, and a second sub-assembly, provided for said cost computation with respect to possible quantization strategies respectively associated to said range values and a selection of one of said strategies according to a cost criterion related to said cost computation.

8. A decoding system according to anyone of claim 6, wherein, the decoded signals corresponding to pictures that have been subdivided into MPEG macroblocks, each macroblock comprises an integer number of ADRC blocks.

* * * * *